(12) United States Patent
Dryfoos et al.

(10) Patent No.: US 6,754,888 B1
(45) Date of Patent: Jun. 22, 2004

(54) FACILITY FOR EVALUATING A PROGRAM FOR DEBUGGING UPON DETECTION OF A DEBUG TRIGGER POINT

(75) Inventors: Robert O. Dryfoos, Poughkeepsie, NY (US); Richard J. Matela, Jr., Pawling, NY (US); Leslie F. Sutton, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/475,886

(22) Filed: Dec. 30, 1999

(51) Int. Cl.[7] .................................................. G06F 9/44
(52) U.S. Cl. ........................ 717/127; 717/128; 717/130
(58) Field of Search ................................. 717/124–135; 711/202, 206–209, 217–218, 221; 712/227, 239–240

(56) References Cited

U.S. PATENT DOCUMENTS

| | | | |
|---|---|---|---|
| 5,265,254 A | * 11/1993 | Blasciak et al. | 717/130 |
| 5,450,586 A | * 9/1995 | Kuzara et al. | 717/124 |
| 5,687,375 A | 11/1997 | Schwiegelshohn | 395/704 |
| 5,715,387 A | * 2/1998 | Barnstijn et al. | 714/38 |
| 5,892,941 A | 4/1999 | Khan et al. | 395/500 |

OTHER PUBLICATIONS

Lauterbach GmbH, "TRACE32 RTOS Debugger," http://www.lauterbach.com/rtos.html, 1999, pp. 1–5.
Abramson et al., (Intensional Programming I. ISLIP, pp. 45–55, 1996) Abstract Only.

* cited by examiner

*Primary Examiner*—Tuan Dam
*Assistant Examiner*—Ted T. Vo
(74) *Attorney, Agent, or Firm*—Andrew J. Wojnicki, Jr., Esq.; Lily Neff, Esq.; Heslin Rothenberg Farley & Mesiti P.C.

(57) ABSTRACT

Method, system and program products for screening a program of a computing environment for debug processing are presented which employ a table that contains information identifying at least some program areas of storage of the computing environment where programs to be debugged may reside and information identifying programs of the computing environment to be excluded from debugging. After detecting a debug trigger point during execution of a program, screening is accomplished by referencing the table to first ascertain whether the trigger point is within a program area of storage meaning that the program under execution may comprise an application program to be debugged, and if so, referencing the table to determine whether the program has been explicitly excluded from the debug processing. If not excluded, debug processing may proceed.

16 Claims, 3 Drawing Sheets

FACILITY FOR EVALUATING A PROGRAM FOR DEBUGGING UPON DETECTION OF A DEBUG TRIGGER POINT

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Method, System and Program Products for Tracing Program Units Using a Mix of Hook-Based Debugging and Hookless Debugging," by Foley et al., Ser. No. 09/475,885 filed on Dec. 30, 1999 ; and "Method, System And Program Products For Selectively Debugging Program Versions Executing Within A Computing Environment," by Dryfoos et al., Ser. No. 09/475,885 filed on Dec. 30, 1999, now U.S. Pat. No. 6,598,180B1.

TECHNICAL FIELD

This invention relates in general to debugging of programs in a production computing environment, and more particularly, to a facility for screening a program of the computing environment for debug processing upon detection of an instruction trigger point during execution of the program.

BACKGROUND OF THE INVENTION

Traditional debug facilities allow a programmer to specify an instruction address in storage where the debugger is to stop program execution and examine the environment. This instruction address is referred to as a trigger point. Unfortunately, if the trigger point is outside of the debug path, or is part of operating system code, then debug and system processing performance are degraded by the instruction trigger point causing the system to unnecessarily stop processing. This is particularly troublesome when debugging production application programs, where the debugger function is typically set to trigger on each instruction that is executed and present the execution information back to the user.

Thus, there is a need in the art for a technique to initially differentiate between instructions in the application programs and instructions in the operating system's service routines that are used by the application programs. It is believed desirable, for performance reasons, to not trigger on instructions in the operating system code.

DISCLOSURE OF THE INVENTION

Briefly summarized, the invention comprises in one aspect, a method of evaluating a program of a computing environment for debugging. The method includes defining a table, wherein the table contains at least one of information identifying at least some areas of main storage of the computing environment where programs to be debugged may reside, or information identifying at least one program of the computing environment to be excluded from debugging. Upon detecting a debug trigger point during execution of the program, the method further includes referencing the table to ascertain at least one of whether the trigger point is within a program area of the storage of the computing environment, or referencing the table to determine whether the trigger point is included within a program to be excluded from debugging.

In an enhanced embodiment, the table contains both information identifying at least some areas of storage of the computing environment where programs to be debugged may reside and information identifying at least one program of the computing environment to be excluded from debugging. In operation, the table is referenced to initially determine whether the executing program is within a program area of main storage where an application program may reside, and if so, the table is referenced again to determine whether the executing program has been excluded from the debug process. If the executing program is outside of areas in storage where application programs may reside, or has been specifically listed for exclusion from debugging, then the debug process is terminated notwithstanding detection of a debug trigger point.

System and computer program products corresponding to the above-summarized methods are also described and claimed.

To restate, presented herein is a facility for screening an executed program upon detection of a debug trigger point in order to eliminate non-application programs from full debug processing. The facility presented herein automatically defines application programs for inclusion in the debug process, thereby relieving a user of the tedious and error prone process of manually keeping track of which processes should be excluded from the debug process. Further, application program areas and/or excluded programs identified in the debug table may be readily modified without changing the basic program evaluation approach or the debug process. The facility herein can be employed with any conventional hooked or hookless debug process.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In accordance with one aspect of the present invention, one or more portions of a program are preliminarily evaluated for tracing or debugging in order, for example, that operating system code may be detected and excluded from the trace/debug process, thereby enhancing system performance. As used herein, an "application program" refers to a program implementing an application function, while an "operating system program" or "operating system code" refers to a program of the operating system, which may also comprise support code outside of the operating system nucleus. Conventionally, application programs and operating system support code are located in defined "program areas" of a computing environment's main storage.

In one embodiment, the present invention comprises a debug table which includes an inclusion portion identifying program areas of storage which may contain application programs, and an exclusion portion which identifies programs marked for exclusion from debugging, such as operating system code. Upon detecting a debug trigger point, the debug table is referenced to determine whether the instruction address trigger point is within an area of storage which may comprise an application program, and if so, whether the particular instruction address comprises part of an excluded program. In this manner, programs which are outside a debug path can be readily eliminated before performing full debug processing on the programs, thereby enhancing system performance.

Figure 1:
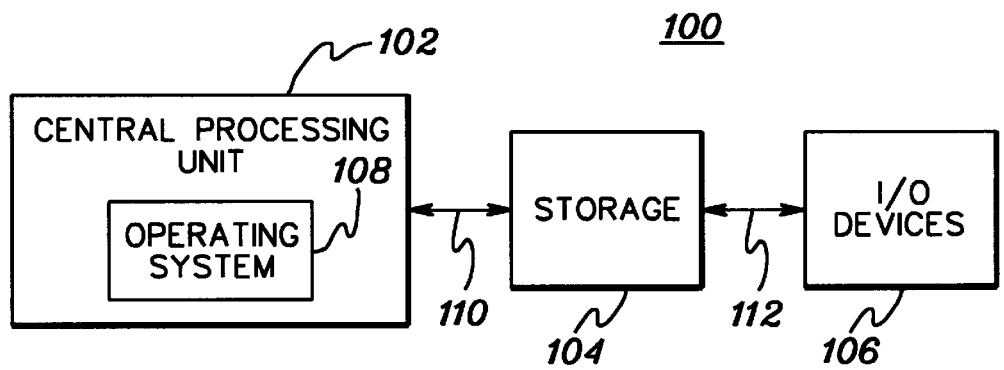
FIG. 1 depicts one example of a computing environment incorporating and using the capabilities of the present invention.

One embodiment of a computing environment incorporating and using the capabilities of the present invention is first described with reference to FIG. 1. A computing environment 100 is based, for instance, on the Enterprise Systems Architecture (ESA)/390 offered by International Business Machines Corporation, Armonk, N.Y. ESA/390 is described in an IBM Publication entitled "Enterprise Systems Architecture/390 Principles of Operation," IBM Publication No. SA22-7201-05, September 1998, which is hereby incorporated herein by reference in its entirety.

Computing environment 100 includes, for instance, one or more central processing units (CPUs) 102, storage 104 and one or more input/output devices 106. Each of these components is described below.

Central processing unit 102 contains the sequencing and processing facilities for instruction execution, interruption action, timing functions, initial program loading and other machine related functions. In one embodiment, central processing unit 102 executes an operating system 108, such as, for instance, the Transaction Processing Facility (TPF) offered by International Business Machines Corporation. TPF controls the execution of transactions and/or programs running within the system and the processing of data. Further, TPF is also used with one or more of the tracing capabilities of the present invention, as described below. One example of TPF is described in detail in "TPF V4R1 Concepts and Structures," IBM Pub. No. GH31-0139-06, Mar. 23, 1999, which is hereby incorporated herein by reference in its entirety.

Central processing unit 102 is coupled via, for example, a bidirectional bus 110, to storage 104. Storage 104 is, for instance, directly addressable and provides for high-speed processing of data by the central processing unit(s). Storage 104 can be physically integrated with the CPU(s) or constructed as stand-alone units.

Storage 104 is further coupled via, for instance, a bidirectional bus 112, to input/output devices 106. Input/output devices 106 may include, for instance, printers, magnetic tape units, direct access storage devices (DASD), displays, keyboards, communication controllers, teleprocessing devices and optical and sensor-based equipment. Data is transferred from storage 104 to I/O devices 106 and from the I/O devices back to storage via known input/output commands.

The above-described computing environment is only one example. The capabilities of the present invention can be used with many other computing environments without departing from the spirit of the present invention. For example, the capabilities of the present invention can be used with Windows NT, AIX or other systems.

Figure 2:
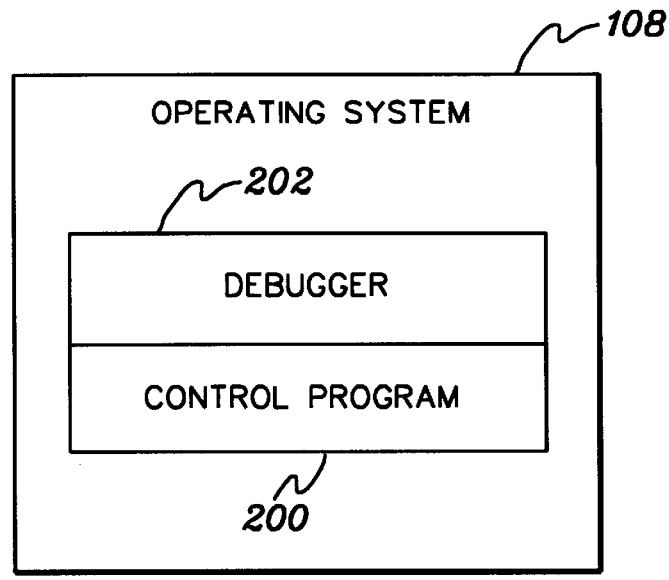
FIG. 2 depicts one example of various components associated with an operating system used with the present invention.

Further details of operating system 108 are described with reference to FIG. 2. In one example, operating system 108 includes a control program 200, which performs many of the control functions associated with an operating system. Coupled to control program 200 is at least one debugger 202. A debugger can be implemented in software, hardware, microcode or any combination thereof. In one embodiment, debugger 202 is sold as a package with the TPF operating system of International Business Machines Corporation.

Although the debugger is shown as part of the operating system, this is not necessary. A portion or all of the debugger may be separate from the operating system.

Operating system 108 may also include various other programs/tools that need not be described for the various aspects of the present invention.

Figure 3:
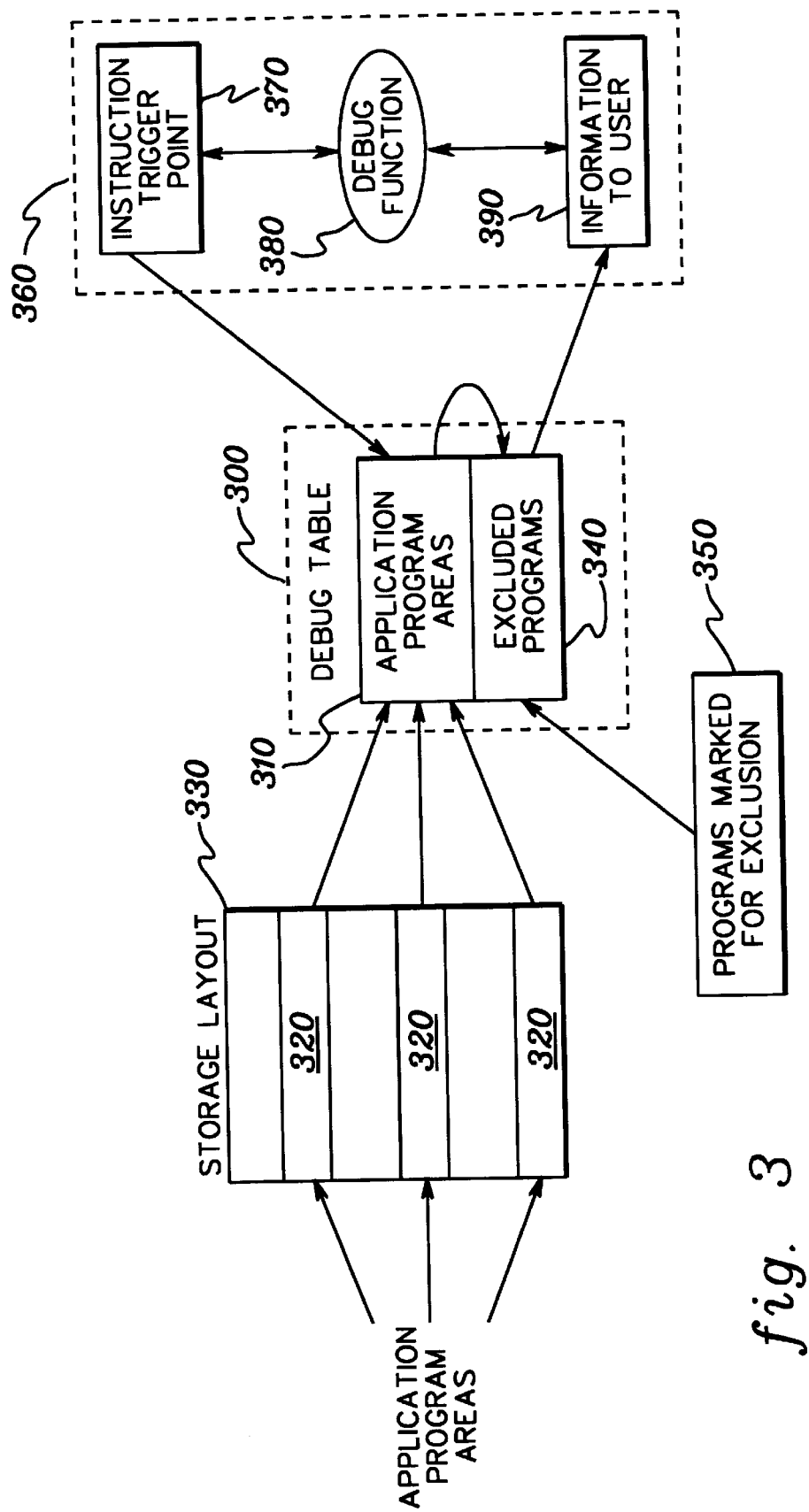
FIG. 3 depicts one example of logic associated with evaluating an application program for debugging in accordance with the principles of the present invention.
Figure 4:
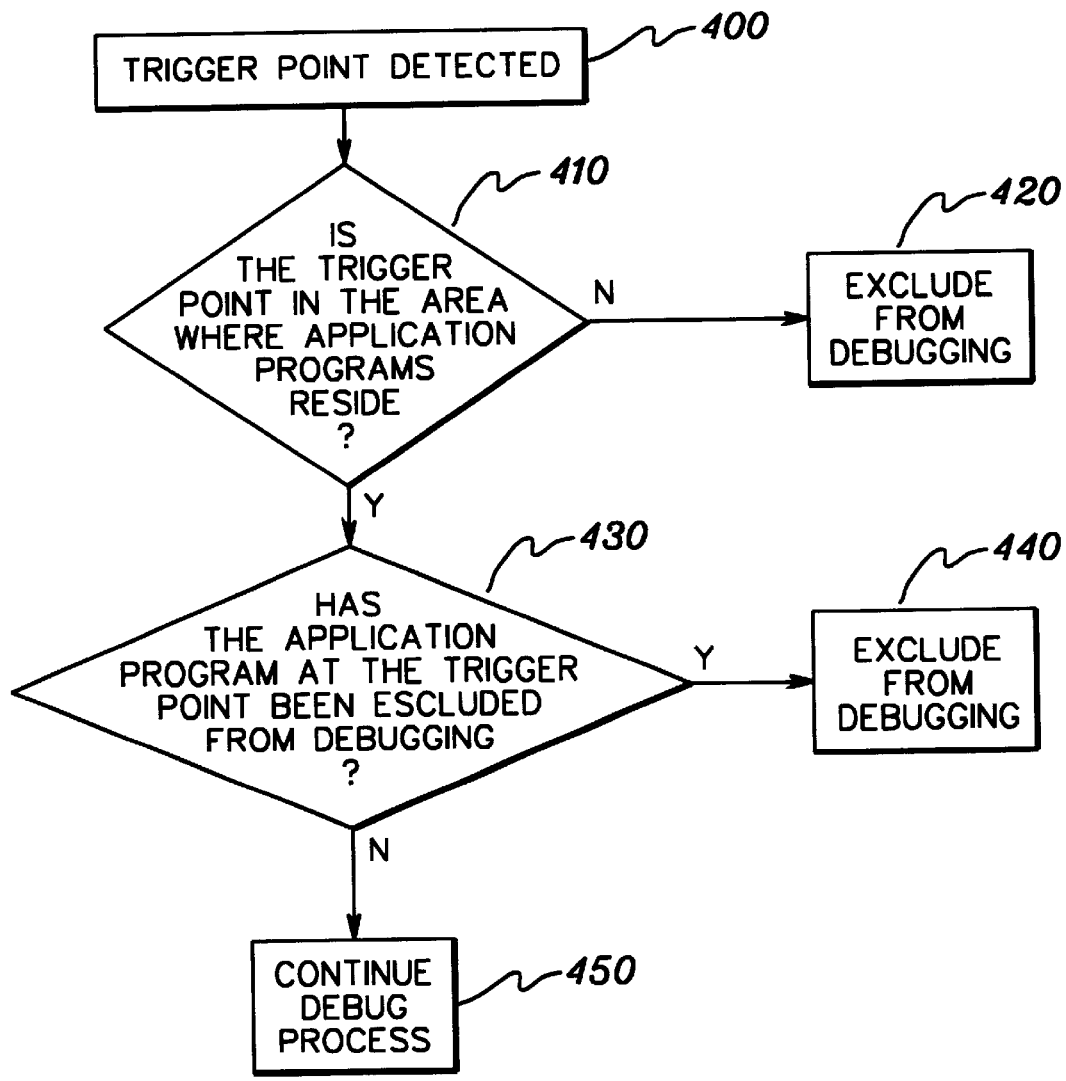
FIG. 4 is a flowchart of one example of a process for evaluating a program for debugging in accordance with the principles of the present invention.

One embodiment of logic for evaluating a program for debugging in accordance with the principles of the present invention is depicted in FIGS. 3 & 4 and described below.

FIG. 3 depicts one example of a debug table 300 constructed and used in accordance with the present invention. Table 300 is a two-part table to be used by the debugger function to, for example, exclude operating system code from the debug process. A first portion of table 300 comprises an inclusion portion referred to herein as application program areas portion 310. Portion 310 is a list of main storage 330 areas where application programs could reside, herein "application program areas" 320. The application program areas 320 may also contain operating system support code, which ideally is to be excluded from the debug process.

The second portion 340 of table 300 identifies programs to be excluded from debugging, such as special application programs and/or operating system programs which may reside in the application program areas 320, but which have been specifically tagged for exclusion from debugging. The programs marked for exclusion 350 are listed in the excluded programs portion 340 of table 300.

One skilled in the art can readily identify application program areas 320 of main storage 330 to be included in first portion 310 of table 300, and programs marked for exclusion 350 to be included in the second portion 340 of table 300. Both types of system information are available to the operating system itself upon customer setup of the computing environment.

The debug processing 360 uses table 300 to quickly exclude code from the debug process by determining whether the executing code, having the instruction trigger point 370, is in the application area 310 and has not been specifically excluded from debugging 340. If the first inquiry fails or the second succeeds, then the debug function 380 is terminated. Otherwise, the debug processing proceeds and debug information is provided to the user 390.

FIG. 4 presents one embodiment of program evaluation in accordance with the present invention. Upon detection of an instruction trigger point 400 in an executing program, processing determines whether the trigger point is in a main memory area where application programs reside 410. This determination is made with reference to debug table 300 of FIG. 3. If no, then the executing program is excluded from the debug process 420. If the instruction trigger point is within an application program area, then processing determines whether the executing program has been excluded from the debug process 430, again with reference to the debug table 300 (FIG. 3). If yes, then the executing program is excluded from the debug process 440. Otherwise, the debug process may proceed 450, for example, using any conventional debug processing technique.

Those skilled in the art will note from the above-description that the present invention advantageously allows a user of a computing environment to automatically define application programs for inclusion in the debug process, thereby relieving the user of the tedious and error-prone process of manually keeping track of which processes should be excluded. Further, application program areas and/or excluded programs may be readily modified without changing the basic program evaluation approach presented herein. The facility of the present invention is particularly advantageous in a multiple concurrent debug environment wherein multiple debug sessions may be under simultaneous processing or multiple versions of an executing program may be in the process of being debugged.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of evaluating a program of a computing environment for debug processing, said method comprising:
   automatically defining a table containing a first portion with information identifying areas of storage of the computing environment where application programs to be debugged may reside and a second portion with information identifying at least one operating system program of the computing environment to be excluded from debugging; and
   upon detecting a debug trigger point during executing of said program, referencing said first portion of said table to ascertain that said trigger point is to an application program area of said storage, and referencing said second portion of said table to ascertain that the trigger point is not referencing an operating system program excluded from debugging.

2. The method of claim 1, further comprising excluding said program from debugging if said trigger point is not to an application program area of said storage, or if within said program area, excluding said program from debugging if said referencing to said table determines that said trigger point is referencing an operating system program excluded from debugging.

3. The method of claim 1, further comprising continuing with said debug processing if said trigger point is to an application program area of said storage and is not referencing an operating system program excluded from debugging.

4. The method of claim 1, wherein said at least some program areas in storage comprise at least some program areas in main storage of said computing environment for holding production application programs.

5. The method of claim 1, wherein said trigger point comprises one instruction address within a range of instruction addresses to be trapped for debugging.

6. A system for evaluating a program of a computer environment for debug processing, said system comprising:
   means for automatically defining a table containing a first portion with information identifying areas of main storage of the computer environment where application programs to be debugged may reside and a second portion with information identifying at least one operating system program of the computing environment to be excluded from debugging; and
   means for referencing said first portion and said second portion of said table upon detection of a debug trigger point during execution of said program to ascertain that said trigger point is to an application program area of said main storage, and that said trigger point is not referencing an operating system program excluded from debugging.

7. The system of claim 6, further comprising means for excluding said program from debugging if said means for referencing determines that said trigger point is not to an application program area of said storage, or if within said program area, said means for referencing determines from said second portion of said table that said program executing upon detection of said trigger point is an operating system program excluded from debugging.

8. The system of claim 6, further comprising means for continuing with said debug processing if said means for referencing said first portion and said second portion of said table determines that said trigger point is within an application program area of said storage and is not an operating system program excluded from debugging.

9. The system of claim 6, wherein said at least some program areas in storage comprise at least some program areas in main storage of said computer environment for holding production application programs.

10. The system of claim 6, wherein said trigger point comprises one instruction address within a range of instruction addresses to be trapped for debugging.

11. A system of screening a program of a computer environment for debugging, said system comprising:
   an automatically generated table containing a first portion with information identifying areas of main storage of the computer environment where application programs to be debugged may reside and a second portion with information identifying at least one operating system program of the computer environment to be excluded from debugging; and
   a computing unit adapted to reference said first portion and said second portion of said table upon detection of a debug trigger point during execution of said program to ascertain that said trigger point is to an application program area of said main storage, and to ascertain that the trigger point is not referencing an operating system program excluded from debugging.

12. At least one program storage device readable by a machine, tangibly embodying at least one program of instructions executable by the machine to perform a method of evaluating a program of a computing environment for debugging, said method comprising:

automatically defining a table containing a first portion with information identifying areas of storage of the computing environment where application programs to be debugged may reside and a second portion with information identifying at least one operating system program of the computing environment to be excluded from debugging; and upon detecting a debug trigger point during executing of said program, referencing said first portion of said table to ascertain that said trigger point is to an application program area of said storage, and referencing said second portion of said table to ascertain that said trigger point is not referencing an operating system program excluded from debugging.

13. The at least one program storage device of claim 12, further comprising excluding said program from debugging if said trigger point is not to an application program area of said storage, or if within said program area, excluding said program from debugging if said referencing to said table determines that said trigger point is referencing an operating system program excluded from debugging.

14. The at least one program storage device of claim 12, further comprising continuing with said debug processing if said trigger point is to an application program area of said storage and is not referencing an operating system program excluded from debugging.

15. The at least one program storage device of claim 12, wherein said at least some program areas in storage comprise at least some program areas in main storage of said computing environment for holding production application programs.

16. The at least one program storage device of claim 12, wherein said trigger point comprises one instruction address within a range of instruction addresses to be trapped for debugging.

* * * * *

UNITED STATES PATENT AND TRADEMARK OFFICE
CERTIFICATE OF CORRECTION

PATENT NO. : 6,754,888 B1
DATED : June 22, 2004
INVENTOR(S) : Dryfoos et al.

It is certified that error appears in the above-identified patent and that said Letters Patent is hereby corrected as shown below:

Column 1,
Line 21, delete "09/475,885" and insert -- 09/475,887 --

Signed and Sealed this

Seventeenth Day of August, 2004

JON W. DUDAS
*Acting Director of the United States Patent and Trademark Office*